UNITED STATES PATENT OFFICE.

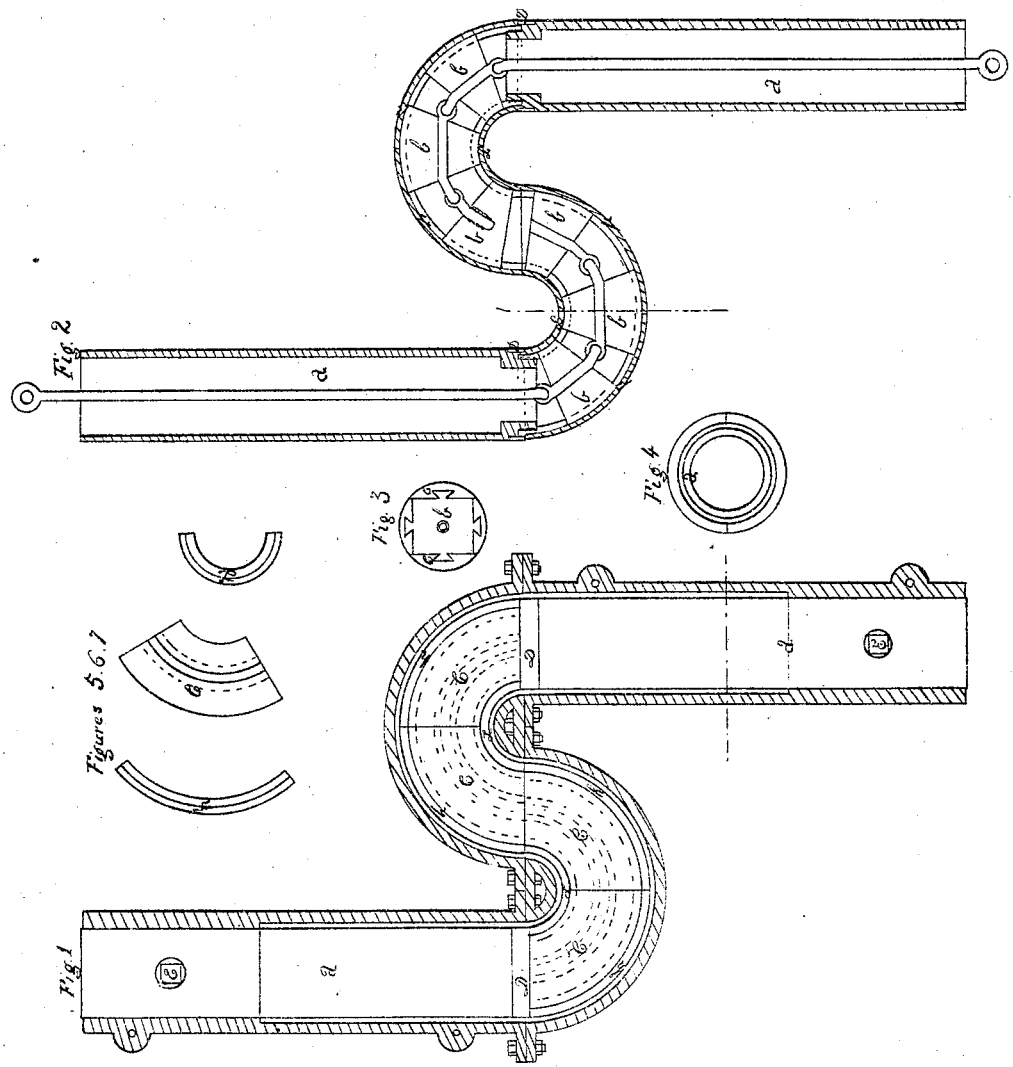
J. A. Lowe,
Mould.
No 25,572.
Patented Sep 27, 1859

JAMES ALLEN LOWE, OF NEW YORK, N. Y.

IMPROVEMENT IN MOLDING WATER-TRAPS.

Specification forming part of Letters Patent No. 25,572, dated September 27, 1859.

*To all whom it may concern:*

Be it known that I, JAMES ALLEN LOWE, of the city, county, and State of New York, have invented a new and useful Improvement in Molds for the Manufacturing of Plumbers' Traps; and I do hereby declare the following to be a full and exact description of the same, reference being had to the accompanying drawings, and to the letters of reference made thereon.

Figure 1 is a view of half a mold for a double S-trap, with the core lying in it. Fig. 2 is a longitudinal section of the core through the parting of the mold. Fig. 3 is a cross-section of core through red line. Fig. 4 is a cross-section of mold and core through red line. Figs. 5, 6, 7 are details of pieces $h\,h$ C C L L.

In plumbing-work it is necessary, where connections are made with sewers or sinks, to guard against effluvia rising through the pipes into the house. It is done by placing what is termed by plumbers a "trap" in the pipe, which is some peculiar turn in the pipe by which the lower part of the turn is always full of water, through which the effluvia cannot rise.

The present manner of constructing traps is to take two pieces of sheet-lead, bend them over an iron form or otherwise, and fit them and solder them together, and as the solder is softer than lead the trap must be weaker in the seam than elsewhere, also when formed the sheet-lead is thinner in the bend, the place where the most strength is required, when by casting them these difficulties are completely obviated, not only making the trap equal in strength all over, or even thicker in certain parts, if required, but also being a saving in labor as well as in the consumption of solder; but in casting, the traps being such peculiar shape, it is necessary to have a core that can be drawn without injury to the trap, which is so easily bent that sand cores cannot be used; but by constructing a metal core in the following manner it can be drawn easily without injury to the trap. First turn a metal ring whose section will show a square with dovetails on all sides, like those shown in Fig. 3. Then turn other rings from which to make the pieces C C, also $h\,h$ and L. Then cut a piece out of the first ring large enough to slide all the other pieces onto their places, which, when all on, will form a circle, which must then be turned round, and now removing the outside pieces cut from the first ring the six plugs $b$ $b$, shown in the drawings. Then join three together with wire eyes, so they will form a circle or straight line with ease, to one end of which attach a wire or chain sufficiently long to reach out of the straight part of the trap. Then placing the outside pieces again upon the plugs, so as to form two half-circles, into one end of each chase a screw as small as the square wi l permit, into which fit the hollow cylinder $a$, upon which shrink the collar D, and let it be shouldered down far enough on the outside pieces to press them firmly against the screw on the cylinder. This gives us the core in two pieces, and now by fitting the center joint with short steady-pins, and by screwing one half into a mold with long bearings, as shown in Fig. 1, and drawing the other half firmly against it, it will tightly close all the cross-joints of the core, while the dovetails on the plugs will hold the longitudinal joints equally tight if well fitted. Now close the mold, and it is ready for casting. After casting, unscrew the hollow cylinders, draw them out, also the plugs, by means of the chain or wire attached to them, and all that remain are the outside pieces, which can be drawn, (by metal hooks the ends of which are fitted into holes bored on the inside of said pieces,) leaving a perfect trap.

What I claim as my invention, and desire to secure by Letters Patent, is—

The application of a metallic core, constructed and operating, substantially as herein described, to cast water-traps.

JAMES ALLEN LOWE.

Witnesses:
HENRY LANGHORNE,
WM. L. BURNS.